J. F. LANGDON.
BAND CUTTER AND FEEDER.
APPLICATION FILED APR. 4, 1908.

985,183.

Patented Feb. 28, 1911.

3 SHEETS—SHEET 1.

Witnesses

Inventor
J. F. Langdon

By
Attorneys

J. F. LANGDON.
BAND CUTTER AND FEEDER.
APPLICATION FILED APR. 4, 1908.
985,183.
Patented Feb. 28, 1911.
3 SHEETS—SHEET 2.
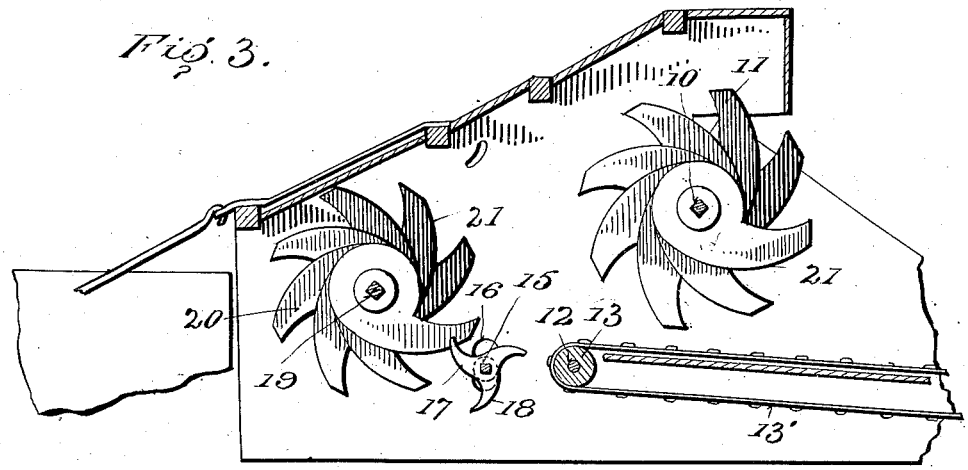
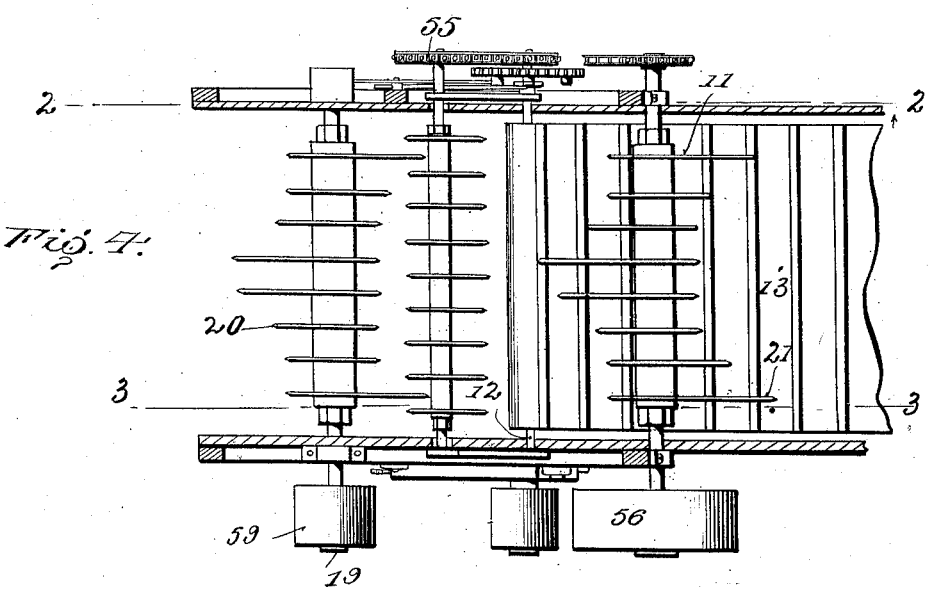

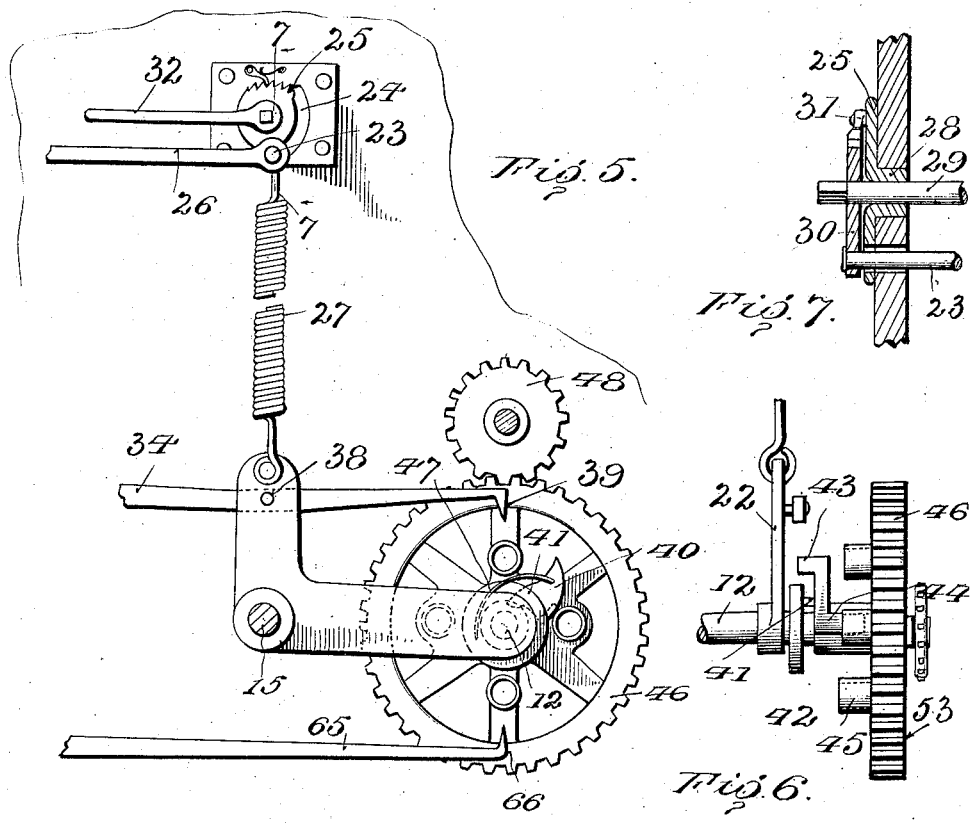

UNITED STATES PATENT OFFICE.

JOHN F. LANGDON, OF WICHITA, KANSAS.

BAND-CUTTER AND FEEDER.

985,183.

Specification of Letters Patent. Patented Feb. 28, 1911.

Application filed April 4, 1908. Serial No. 425,236.

*To all whom it may concern:*

Be it known that I, JOHN F. LANGDON, citizen of the United States, residing at Wichita, in the county of Sedgwick and State of Kansas, have invented certain new and useful Improvements in Band-Cutters and Feeders, of which the following is a specification.

This invention relates to self-feeders for threshing machines, clover hullers, alfalfa mills and similar machinery and has for its object to provide a strong, durable and thoroughly efficient device of this character, the construction of which is such as to effectually loosen and divide the stock or material and insure an even distribution of the same to the receiving machine.

A further object of the invention is to provide a self feeder including main and auxiliary governors which act automatically to control the supply of material to the receiving machine when an overcharge occurs, either by reason of an excess volume of material or by reason of the condition of said material.

A further object is to provide a self feeder having a rapidly revolving band cutter, the blades or cutting devices of which intermesh with the spaced fingers of a slowly revolving retarder thereby to prevent the flat wet bundles or bundles of damp tangled material from passing to the receiving machine.

A further object of the invention is to provide means for normally and yieldably retaining the retarder in operative relation with respect to the cutting devices of the rear cutter, and means for adjusting the retarder relative to said rear cutter.

A still further object of the invention is generally to improve this class of devices so as to increase their utility, durability, and efficiency as well as to reduce the cost of manufacture.

Further objects and advantages will appear in the following description, it being understood that various changes in form, proportions and minor details of construction may be resorted to within the scope of the appended claims.

Figure 1:
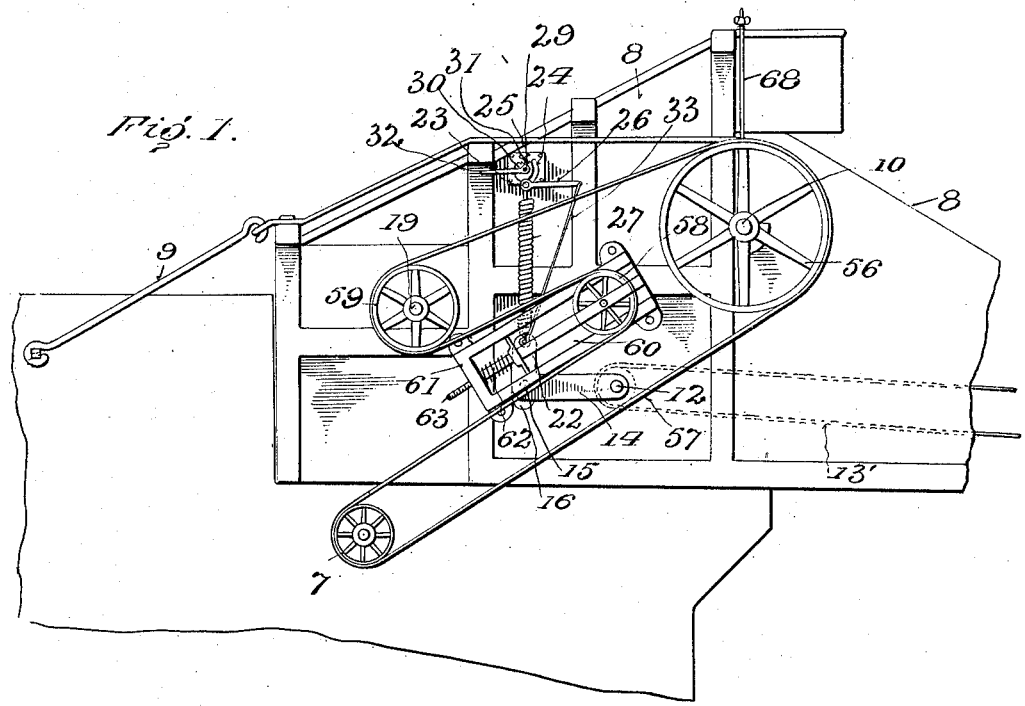
Figure 2:
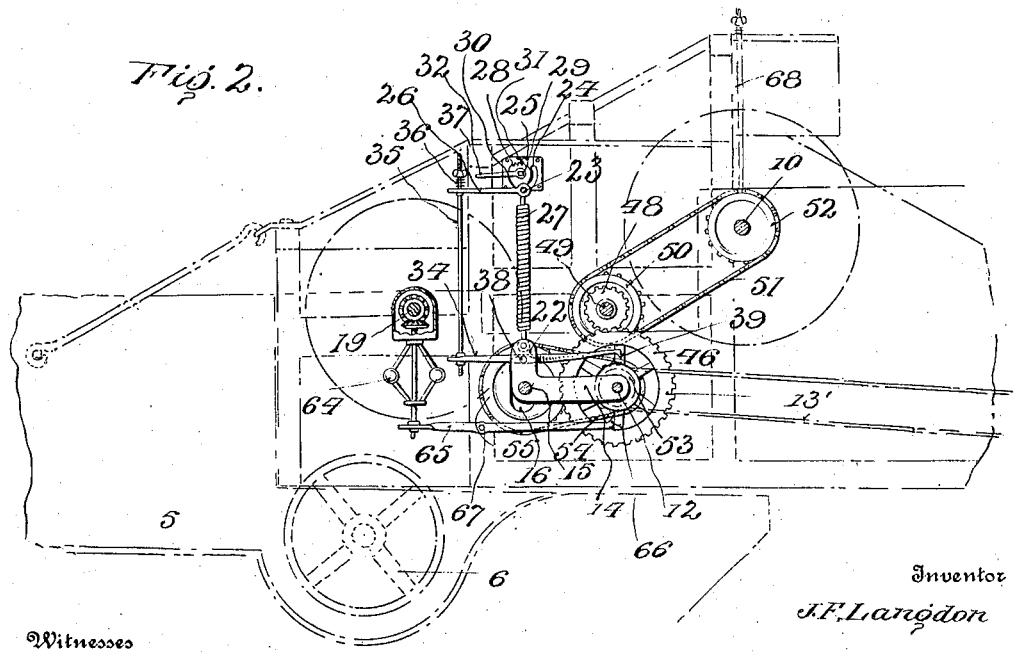

For a full understanding of the invention and the merits thereof, reference is to be had to the following description and accompanying drawings, in which:

Figure 1 is a side elevation of a self feeder constructed in accordance with my invention. Fig. 2 is a vertical sectional view partly in elevation taken on the line 2—2 of Fig. 4, the framework or casing being shown in dotted line. Fig. 3 is a transverse sectional view taken on the line 3—3 of Fig. 4. Fig. 4 is a horizontal sectional view. Fig. 5 is a side elevation partly in section of the pivoted supporting brackets or yokes, and their associated parts. Fig. 6 is a partial end view of Fig. 5. Fig. 7 is a vertical sectional view taken on the line 7—7 of Fig. 5.

Corresponding and like parts are referred to in the following description and indicated in all the views of the accompanying drawings by the same reference numerals.

The improved self feeder forming the subject matter of the present invention is principally designed for attachment to threshing machines, clover hullers, alfalfa mills and similar machinery and by way of illustration is shown in connection with a threshing machine of the ordinary construction in which 5 designates the body of the threshing machine and 6 the cylinder carrying the driving pulley 7.

The feeder comprises a casing 8 open at its opposite ends and having its rear portion anchored by suitable tie rods 9 to the threshing machine 5 above the cylinder 6, as shown. Journaled in the opposite walls of the casing 8 is a transverse shaft 10, having a plurality of spaced cutting blades 11 secured thereto and adapted to sever the securing bands or strings of the stock and divide the bunch as the latter is fed through the casing to the threshing machine. Located below and slightly in the rear of the shaft 10 is a tranverse shaft 12 to which is secured a roller 13 carrying the rear end of the conveyer 13¹, the latter constituting the means employed for feeding the stock or material to the band cutters. The opposite ends of the transverse shaft 12 are extended laterally beyond the opposite side walls of the casing 8 to form supports for a pair of pivotally mounted angularly disposed brackets or yokes 14 in which is journaled the retarder shaft 15. The opposite ends of the shaft 15 project through elongated openings 16 formed in the adjacent side walls of the casing 8 for attachment to the brackets 14, while the intermediate portion of the shaft 15 is provided with a plurality of spaced spirally disposed retarding fingers 17, the lower edges of which are curved or rounded at 18 for engagement with the under side of the bunch or stock, as the latter passes between the retarding fingers and the rear band cutter.

The rear band cutter comprises a shaft 19 having a plurality of spaced cutting blades 20 secured thereto and similar in construction to the blades 11 of the front band cutter. Attention is here called to the fact that the cutting edges 21 of both the front and rear cutters are formed in the arc of a circle so as to effectually engage and sever the bands or strings employed for retaining the stock in bunches as the latter is fed into the machine.

Extending transversely across the interior of the casing 8 and preferably disposed in alinement with the angular extensions 22 of the supporting brackets 14 is a rocking bar 23 having its opposite ends extended through segmental slots 24 in an attaching plate 25 and provided with angularly disposed arms 26 extending in opposite directions for the purpose hereinafter referred to.

Disposed at one side of the machine and operatively connected with the rocking shaft 23 and the extension 22 of one of the brackets 14 is a coil spring 27 which serves to normally and yieldably support the retarder in operative relation with the cutting devices on the shaft 19.

It will here be noted that the fingers 17 normally intermesh with the cutting devices 20 on the shaft 19 so that should a flat wet bundle or a mass of damp or wet material find its way past the forward band cutter the same will depress the yoke against the action of the spring 27 and automatically check the feed or material on the conveyer 13$^1$, as will be more fully explained hereinafter. A similar plate 25 and coil spring 27 are arranged on the opposite side of the casing and operatively connected with the adjacent angular extension 22 and rocking shaft 23, in the manner before described.

Each attaching plate 25 is formed with a bushing 28 which receives a lifting shaft 29, the latter being extended transversely through the casing 8 and provided with ratchets 30 for engagement with spring pressed pawls 31, the opposite ends of the shaft 29 being provided with terminal handles 32 so that by operating the handles 32 the rock shaft 23 may be adjusted vertically of the casing within the slots 24 thereby to regulate the tension of the springs 27 and also to raise or lower the retarder with respect to the rear band cutter.

The crank arm 26 on one side of the casing is connected to the adjacent angular extension 22 through the medium of a rod 33, while the angular arm 26 on the other side of the casing is connected to an emergency trip lever 34 by means of a vertically disposed rod 35, there being a spring 36 coiled around the rod 35 for the purpose of preventing injury to the trip lever 34 should the latter be pressed downwardly too far. The lever 34 is pivotally mounted at 38 on the angular extension 22 of one of the brackets 14 while the free end of said lever is bent inwardly to produce an actuating lip 39, which engages a trip dog 40, when an overcharge of material is fed to the machine for the purpose of automatically checking the material, as will be more fully explained hereinafter. The trip dog 40 is pivotally mounted at 41 on the disk or flange 42 rigidly secured to the shaft 12, one end of said dog being provided with a laterally extending lug 43 and the other end thereof formed with a lateral projection 44 which normally extends into the path of movement of a plurality of driving rollers 45 carried by a gear wheel 46. The gear wheel 46 is loosely mounted on the shaft 12 and is rotated with said shaft by engagement of the rollers 45 with the projection 44 of the trip dog, a spring 47 being provided for normally and yieldably retaining the projecting portion 44 of the trip dog in the path of movement of the rollers 45. The gear 46 meshes with a pinion 48 mounted on a stub shaft 49 projecting laterally from one side of the casing and also carrying a sprocket wheel 50, the latter being connected through the medium of a sprocket chain 51 with a similar sprocket wheel 52 secured to one end of the cutter shaft 10, as best shown in Fig. 2 of the drawings. A sprocket wheel 53 is also secured to one side of the gear wheel 46 for engagement with a sprocket chain 54 extending over a sprocket wheel 55 on one end of the retarder shaft 15, so that motion may be transmitted from the conveyer 13$^1$ to the retarder to rotate the retarder. Secured to the other end of the forward cutter shaft 10 is a relatively large band wheel or pulley 56 which receives a belt 57, the latter being extended around the driving pulley 7 on the threshing cylinder and also around an idle pulley 58; and a relatively small band wheel or pulley 59 secured to one end of the rear cutter shaft 19. The idle pulley 58 constitutes in effect a belt tightener and is journaled on a block or support 60 slidably mounted in a substantially rectangular frame 61, the latter being disposed at an angle or inclination to the base of the casing 8 and secured to the latter by bolts or similar fastening devices. The pulley 58 is normally and yieldably supported at one end of the frame 61 by means of a coil spring 62 one end of which bears against the sliding block 60 and the other end thereof against the adjacent portion of the frame 61, there being a threaded rod 63 provided for regulating the tension of the spring 62 when desired. Depending from the opposite end of the inner cutter shaft 19 and operatively connected therewith in any suitable manner is a governor 64 having its lower end fastened to the adjacent end of a trip lever 65, the opposite end of which is provided with an upwardly extending lip or lug 66 similar in construction to the lip or lug 39 on the emergency trip lever 34. The intermediate portion of the trip lever 65 is pivotally mounted at 67 on the casing 8 so that when the shaft 19 is retarded the governor 64 will be actuated to force the lip 66 of the lever 65 into engagement with the trip dog 40 and thus move the latter out of the path of movement of the driving rollers 45, thereby to render the gear wheel 46 idle and thus check the feed of material on the conveyer in case of an overcharge in volume of said material.

An adjusting rod 68 is preferably mounted on the casing and is operatively connected with the bearings of the forward cutter shaft 10 for the purpose of vertically adjusting the latter.

Thus it will be seen that should an overcharge in the volume of material occur at the forward band cutter the sudden pull would cause the belt 57 to slip on the pulley 7 and thus exert a pressure on the loose pulley 58 against the tension of the spring 62 thereby allowing the belt to slip on the pulley 59 and thereby actuate the governor 64 to tilt the lever 65 and force the active lip 66 of the said lever to engagement with the trip dog 40. When the lip 66 engages the dog 40 the latter will be tilted against the action of the spring 47 so as to move the projecting portion 44 of the trip dog out of the path of movement of the driving rollers 43, thus rendering the pulley of the gear wheel 46 idle and effectually checking the supply of material or stock of the feeder until the rear cutting blades 20 and retarding fingers 17 have divided and equally distributed the material. This checking of the material to the feeder is effected without checking the threshing machine cylinder and without interfering with the rotation of the rear cutter 20 and retarder shaft 15. Should an uncut bundle accidentally pass by the forward band cutter 11 or should a flat bundle of stock or a mass of wet or damp material enter the casing, the same will be effectually prevented from being delivered to the receiving machine by means of the automatic emergency governor before described, as follows; should the stoppage or obstruction occur, say, for instance, on the left under side of the machine, the weight of the bundle or stock will depress the bracket carrying retarder against the tension of the coiled spring 27 and cause the lip 39 of the emergency trip lever 34 to disengage the trip dog 40 from the rollers on the gear wheel 46 thereby to automatically check the feed of material until the band cutters and retarder fingers have loosened up the tangled mass of stock and evenly distributed the latter for delivery to the threshing machine cylinder. Should an obstruction occur on the opposite side of the machine the weight of the stock or bundle will depress the brackets 14, in the manner before stated, and in so doing will cause the rod 33 to tilt the adjacent arm 26 downwardly and the arm 26 on the other side of the machine upwardly, thereby to exert an upward pull on the rod 35 and tilt the emergency trip lever 34 to release the dog 40 and likewise check the supply of material to the feeder. It is obvious that should an obstruction occur in the center of the retarder, both brackets being connected by coil springs 27, said brackets will be forced downwardly simultaneously to effect the actuation of the trip dog 40. Thus it will be seen that the mechanism herein shown and described, is operated effectually to check the feed of material or stock both as to volume and as to the condition of the stock, the latter operation being effected by reason of the intermeshing engagement of the retarder fingers with the cutting devices on the rear band cutter. It will also be noted that the retarding fingers are automatically in action, that is to say, that they are normally and yieldably supported in intermeshing engagement with the teeth on the rear band cutter and operate to effect the movement of the trip dog 40 when an obstruction occurs, without manual manipulation or attention on the part of the operator or other attendant.

While the rear cutter is shown and described with spaced cutting knives it is obvious that the same may be in the form of a cylinder or a shaft, with teeth or with flat bars fastened thereon, without departing from the spirit of the invention.

Having thus described my invention, what is claimed as new is:

1. In a feeder, the combination with a cutter provided with spaced members for engagement with the stock, brackets pivotally mounted for tilting movement beneath the cutter, a retarder mounted for rotation in the brackets and provided with fingers normally intermeshing with said stock engaging members, means for normally and yieldably supporting the retarding fingers in intermeshing engagement with the stock engaging members of the cutter, means for feeding the stock to the cutter and means for automatically checking the delivery of stock to the feeder when an overcharge occurs.

2. In a feeder, the combination with a cutter having a plurality of spaced spirally disposed cutting blades, a rotary conveyer, brackets pivotally connected with the conveyer and provided with angular extensions, a retarder shaft journaled in the brackets and provided with spaced spirally disposed retarding fingers intermeshing with the cutting blades, means operatively connected with the angular extensions on the brackets for normally and yieldably supporting the retarding fingers in intermeshing engagement with the cutting devices, and means for automatically checking the movement of the conveyer when an overcharge of stock passes between the retarding fingers and the cutting blades.

3. In a feeder, the combination with a cutter, provided with a plurality of spaced cutting devices, of pivotally mounted brackets having angular extensions, a retarder shaft journaled in the brackets and provided with a plurality of spaced fingers intermeshing with the cutting devices, springs forming a yieldable connection between the retarder shaft and the angular extensions of the brackets for normally and yieldingly supporting the retarding fingers and cutting devices in intermeshing engagement, means operatively connected with the retarder shaft for raising and lowering the latter to adjust the retarding fingers relatively to the cutting devices, means for feeding the stock to the cutting devices, and means for automatically checking the feed of the stock when an overcharge thereof passes between the retarding fingers and cutting devices.

4. In a feeder, the combination with a casing, of a cutter mounted for rotation in the casing and provided with spaced cutting devices, an endless conveyer, brackets pivotally mounted on the conveyer shaft, a retarder shaft journaled in the brackets and provided with a plurality of spaced fingers arranged to intermesh with the cutting devices, there being segmental slots formed in the casing, a transverse shaft seated in said slots, springs forming a connection between the brackets and transverse shaft, and ratchet mechanism operatively connected with the transverse shaft for adjusting the latter vertically of the casing.

5. In a feeder, the combination with a casing, of a band cutter mounted for rotation in the casing and provided with spaced cutting devices, an endless conveyer, brackets pivotally mounted on the conveyer-shaft, a retarder shaft journaled in the brackets and provided with spaced fingers arranged beneath the band cutter and normally intermeshing with the cutting devices, a gear wheel loosely mounted on the conveyer shaft, a dog for clutching the gear wheel to the conveyer or shaft, and main and auxiliary trip levers for releasing the dog to check the feed of stock to the cutting devices when an overcharge of material passes between the retarding fingers and said cutting devices.

6. In a feeder, a casing, a band cutter disposed within the casing and provided with spaced cutting blades, a conveyer, brackets pivotally mounted on the conveyer shaft, a retarder shaft journaled in the brackets and provided with spaced fingers arranged to intermesh with the cutting blades, a gear wheel loosely mounted on said conveyer shaft, a dog for clutching the gear wheel to the conveyer shaft, springs operatively connected with the brackets for normally and yieldably supporting the retarder fingers in an operative relation to the feeding devices, and a trip lever actuated upon the depression of the retarder for releasing the dog thereby to check the supply of stock to the feeder when an overcharge passes between the retarder and cutting devices.

7. In a feeder, the combination with a band cutter, provided with spaced cutting devices, of a retarder disposed beneath the band cutter provided with spaced fingers normally intermeshing with the cutting devices, means for feeding material to the cutting devices, means for automatically checking the feed of stock when a tangled mass of material passes between the retarder and the cutting devices, and other means for automatically checking the feed of material when an overcharge occurs, by reason of an excess in volume of material fed to the machine.

8. In a feeder, the combination with front and rear band cutters each provided with spaced cutting devices, a retarder disposed beneath the band cutter and having spaced fingers normally and yieldably intermeshing with the cutting devices of the rear band cutter, means for feeding stock to the cutting devices, means for automatically checking the feed of material when an overcharge passes between the retarder and rear band cutter, and other means for automatically checking the feed of the material when an increase in the volume of material occurs at the front cutter.

9. In a feeder, the combination with a casing, of spaced band cutters journaled in the casing, a conveyer, a driving wheel loosely mounted on the conveyer shaft, a dog for clutching the driving wheel to the conveyer shaft, means for transmitting motion to the driving wheel from one of the band cutters, a governor operatively connected with the shaft of the other band cutter, a retarder co-acting with the last mentioned band cutter, and a trip lever operatively connected with and actuated by the governor to release the dog, thereby to check the supply of stock to the feeder when an overcharge passes between the retarder and adjacent band cutter.

10. In a feeder, the combination with a casing, of a band cutter provided with spaced cutting devices, a conveyer, a driving wheel loosely mounted on the conveyer shaft, a dog for clutching the driving wheel to the conveyer shaft, spaced brackets pivotally mounted on the conveyer shaft, a retarder journaled in the brackets and co-acting with the cutting devices, a rock shaft having crank arms, springs forming a connection between the crank arms and said brackets for yieldably supporting the retarder, a trip lever operatively connected with one of the crank arms and actuated upon the depression of the retarder to release the dog, thereby to check the supply of stock to the feeder when an overcharge passes between the retarder and cutting devices.

11. In a feeder, the combination with a cutter provided with spaced members for engagement with the stock, supporting means, a rotatable retarder supported by said means beneath the cutter adapted to support the stock in operative relation with said members and adapted to move toward and from the cutter and provided with fingers alternating with said stock engaging members, means operatively connected with the retarder support for normally and yieldably maintaining the retarding fingers in their alternating relation with the stock engaging members of the cutter, means for feeding the stock to the cutter, and means controlled by the retarder for automatically checking the delivery of stock to the feeder when an overcharge occurs.

In testimony whereof I affix my signature in presence of two witnesses.

JOHN F. LANGDON [L. S.]

Witnesses:
THORNTON W. SARGENT,
A. J. ADAMS.

---

Copies of this patent may be obtained for five cents each, by addressing the "Commissioner of Patents Washington, D. C."